United States Patent
Borom et al.

[11] 3,816,704
[45] June 11, 1974

[54] SURFACE HEATING APPARATUS

[75] Inventors: Marcus P. Borom, Schenectady; Joseph E. Burke, Burnt Hills, both of N.Y.

[73] Assignee: General Electric Company, Schenectady, N.Y.

[22] Filed: Mar. 20, 1972

[21] Appl. No.: 236,104

[52] U.S. Cl............ 219/462, 73/156, 106/39 DV, 117/129, 219/347, 219/461, 219/464, 219/530, 219/544, 252/408
[51] Int. Cl............................................ H05b 3/68
[58] Field of Search........... 219/345, 436, 438, 462, 219/530, 540, 543; 99/447; 117/129, 212; 106/39; 73/356; 23/230; 252/408

[56] References Cited
UNITED STATES PATENTS

| | | | |
|---|---|---|---|
| 2,859,321 | 11/1958 | Garaway | 219/345 |
| 2,939,807 | 6/1960 | Needham | 219/345 X |
| 3,263,675 | 8/1966 | Rice et al. | 117/129 X |
| 3,328,145 | 6/1967 | McMillan et al. | 117/129 X |
| 3,505,498 | 4/1970 | Shelvin | 219/438 X |
| 3,561,269 | 2/1971 | Seitz | 73/356 |
| 3,569,672 | 3/1971 | Hurko | 219/464 |
| 3,573,073 | 3/1971 | Duke et al. | 106/39 DV |
| 3,576,604 | 4/1971 | Hammond | 73/356 X |
| 3,622,754 | 11/1971 | Hurko | 219/462 |
| 3,646,321 | 2/1972 | Siegla | 219/464 |

OTHER PUBLICATIONS

W. A. Weye, "Coloured Glasses," Society of Glass Technology, 1967, QD139, G5W4, pp. 308–313.

*Primary Examiner*—Volodymyr Y. Mayewsky
*Attorney, Agent, or Firm*—Gerhard K. Adam; Joseph T. Cohen; Jerome C. Squillaro

[57] ABSTRACT

A smooth surface heating apparatus is provided having a heat spreader plate of high thermal conductivity coated, at least on its upper surface, with a glass-ceramic material containing a predominant crystalline phase of lithium disilicate in a glassy matrix and having a coefficient of expansion in the range of $80–120 \times 10^{-7}$ per °C. An insulated electrical resistance heating element and a reinforcing member are attached to the underside of the heat spreader plate. A reflector pan is provided beneath the heating element to direct the heat in an upward direction.

8 Claims, 5 Drawing Figures

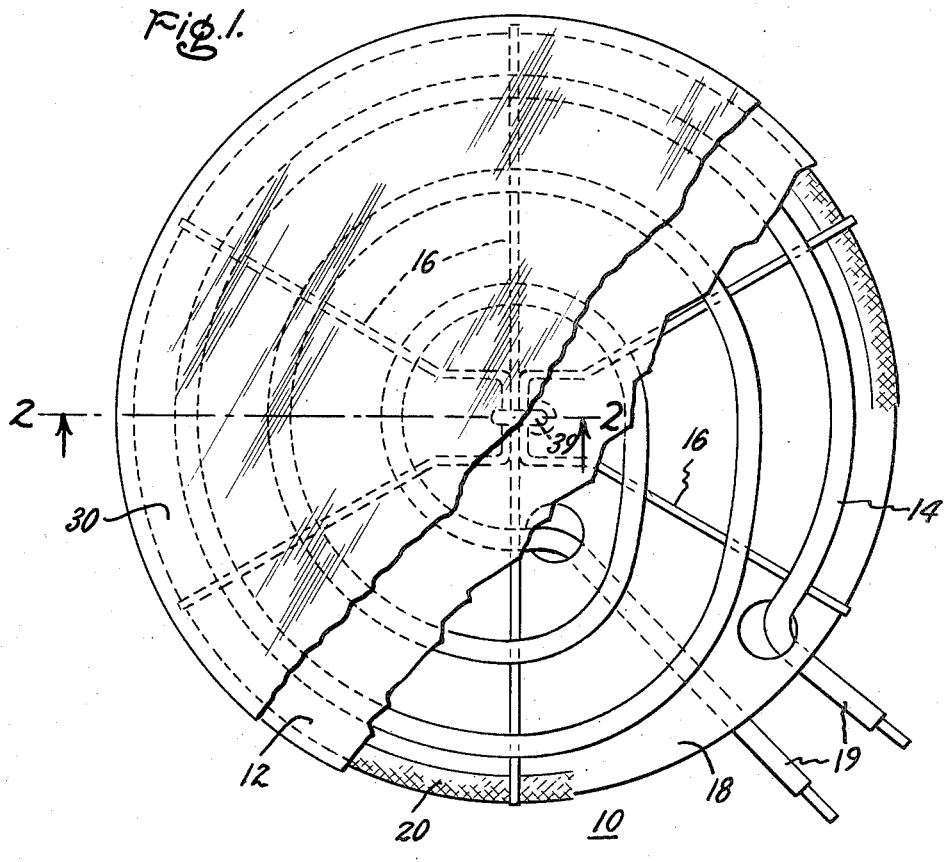
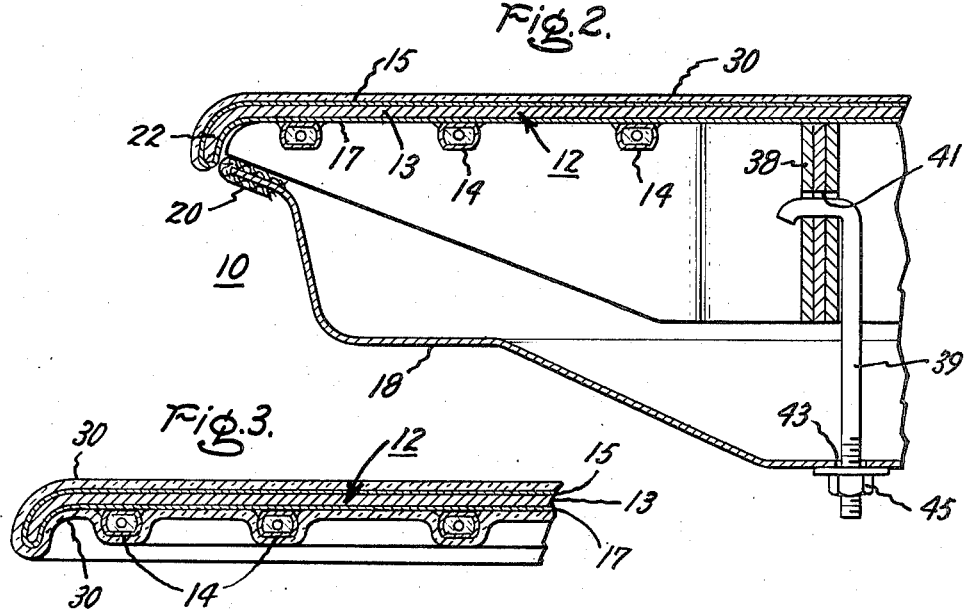

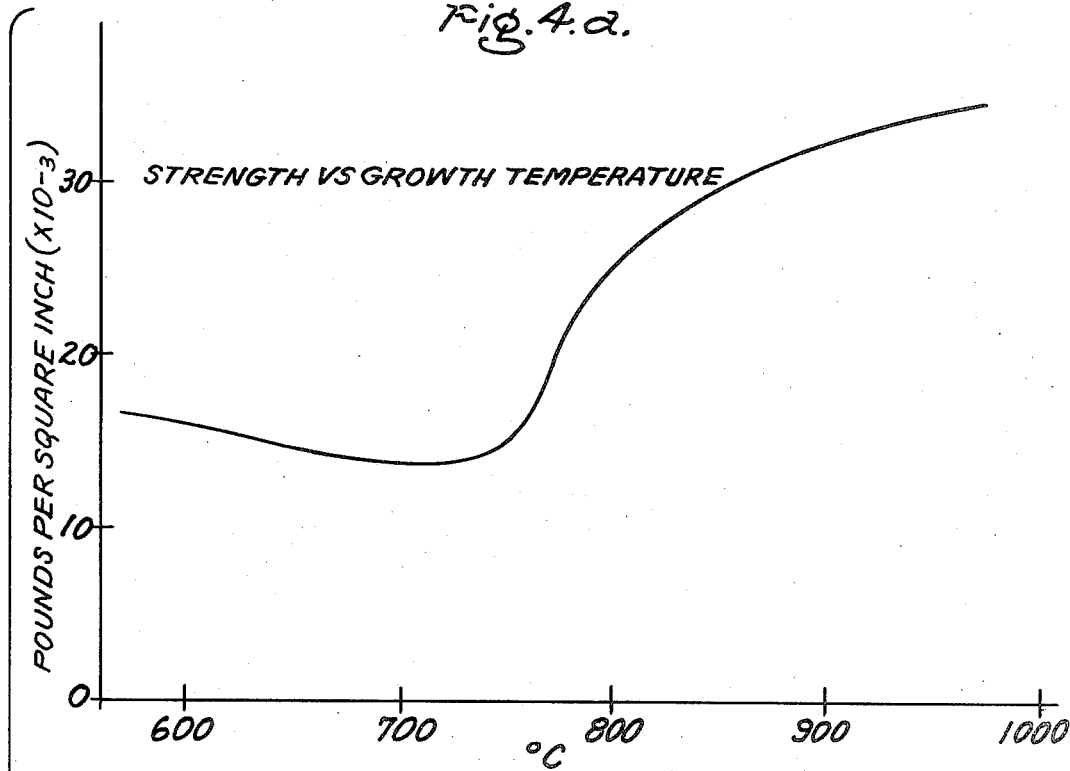
Fig. 4.a.
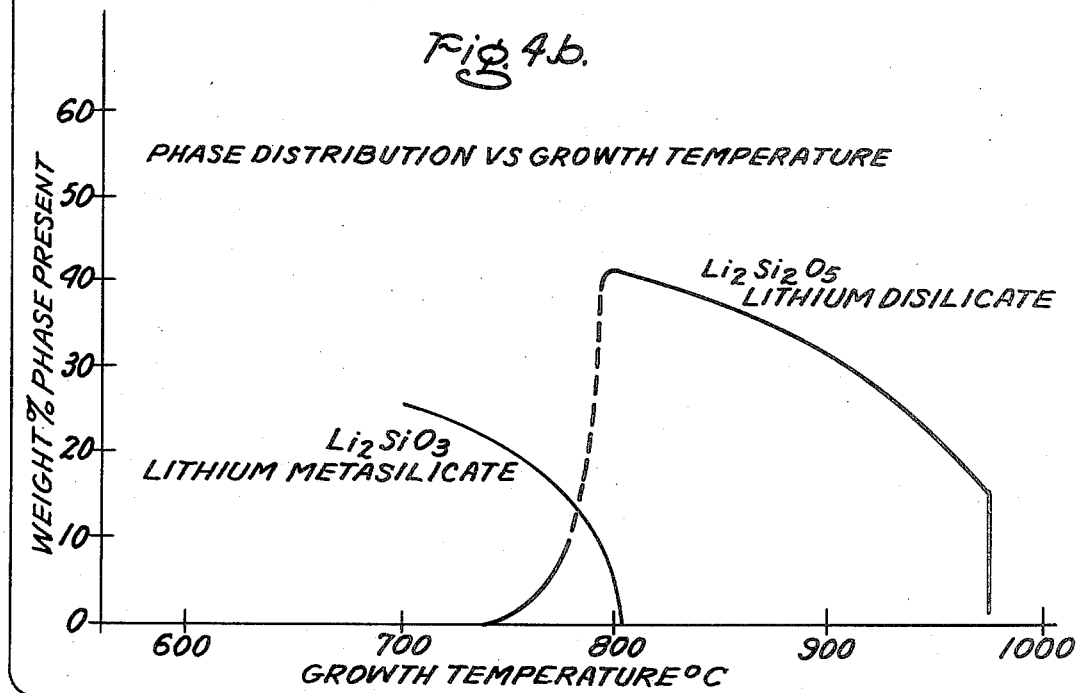
Fig. 4.b.

SURFACE HEATING APPARATUS

Conventional electric cooktops are usually provided with a plurality of metal sheathed electrical resistance heating elements which are each wound in the form of a spiral coil and positioned in an opening formed in the cooktop. Each heating element is adapted to support a cooking utensil thereon. Food soil can be automatically cleaned from the metal sheathed heating elements by the high temperatures reached once the elements are energized, while any spillovers are permitted to drain through the heating element and are accumulated in a collection pan located beneath the cooktop from which they must be manually cleaned.

In order to simplify the cleaning process and to provide a more esthetic appearance, entire counter cooktops or in some cases individual solid surface heating units have been manufactured in which the exposed surface is formed from a glass-ceramic material such as described in U.S. Pat. No. 2,920,971. Materials of this type are commercially available under the trademarks "pyroceram," "CER-VIT," and "HERCUVIT." The opaque glass-ceramic, because of its smooth top surface, not only presents a pleasing appearance, but is also readily cleanable and avoids the drainage of spillovers into the subsurface portions of the unit.

However, a problem which must be considered is that of obtaining rapid heating rates and rapid cooling rates comparable to those of either a standard metal sheathed electrical resistance heating element or a gas surface burner. The rapid transfer of heat through a thick glass-ceramic material does not occur because of its rather poor thermal conductivity. Such materials are widely used as both thermal and electrical insulators, rather than as thermal conductors. Heat does not readily diffuse laterally through the glass-ceramic plate, and during the cooking procedure heat is transferred to the utensil primarily by means of conduction at points of contact between the heating surface unit and the utensil. Moreover, the glass-ceramic plate has a comparatively large heat capacity, which further contributes to slow cooling when the heating element is turned off. Also, this type of glass-ceramic plate becomes more electrically conductive as the temperature is increased, so that a safety hazard might be created when an open-coiled heater is employed as the electrical heating means.

Some of the problems of the prior art have been overcome by locating beneath the glass-ceramic plate a heat spreader plate of high thermal conductivity which bears against the underside of the glass-ceramic plate by mechanical means and thereby creates an even temperature distribution as disclosed in U.S. Pat. No. 3,622,754. Such a unit is capable of efficient operation when used with conventional cooking utensils.

Quite surprisingly, we have now discovered an improved surface heating unit in which a glass-ceramic material has been coated directly on at least the top surface of a heat spreader plate. Since the coating is relatively thin, the heating and cooling rates of the unit remain rapid. The glass-ceramic coating for the heating unit meets the necessary requirements for this application which include chemical corrosion resistance, high mechanical strength, good adhesion to the substrate, high softening temperature, good thermal shock resistance, and a coefficient of thermal expansion which approximately matches that of the substrate.

In accordance with the present invention, we have discovered a smooth surface electric heating apparatus comprised of a heat spreader plate of high thermal conductivity, an insulated electrical resistance heating element attached to the underside of the plate, a reinforcing member also attached to the underside of the plate to prevent warpage, a reflector pan beneath the heating element to direct the heat in an upward direction, and a glass-ceramic coating bonded directly to at least the upper surface of the heat spreader plate.

The glass-ceramic coating consists essentially as calculated from the batch on the oxide basis in weight percent of the following:

| Ingredient | w/o |
| --- | --- |
| $Li_2O$ | 6–20 |
| $Al_2O_3$ | 0–10 |
| $SiO_2$ | 70–80 |
| $P_2O_5$ | 0.5–6.0 |
| $B_2O_3$ | 0–10 |
| $K_2O$ | 0–6 |
| $ZnO$ | 0–5 | wherein the coefficient of expansion of the glass-ceramic is in the range of $80–120 \times 10^{-7}$ per °C. The thickness of glass-ceramic coating should be sufficient to form a protective coating on the surface of the heat spreader plate and typically is about 3 to 12 mils. It is comprised of a crystalline phase of predominantly lithium disilicate ($Li_2O \cdot 2SiO_2$) in a glassy matrix. In order to obtain the desired strength properties the amount of lithium metasilicate ($Li_2O \cdot SiO_2$) should be kept to a minimum. The percent crystallinity may vary to some extent and is preferably up to about 50% and may be somewhat higher as determined by X-ray diffraction techniques. In addition, up to about 5 weight percent conventional coloring agents such as disclosed by Weyl, *Coloured Glasses*, 1951, e.g., the oxides of titanium, vanadium, chromium, manganese, iron, etc., may be added to the glass composition to impart colors which are compatible with the stove top.

The invention is more clearly understood from the following description taken in conjunction with the accompanying drawing in which:

FIG. 1 is a partially broken-away plan view of a smooth surface electrical heating apparatus employing the present invention;

FIG. 2 is a fragmentary cross sectional view of the surface electrical heating unit of FIG. 1 taken along line 2—2 with parts broken away to show the various portions of the assembly;

FIG. 3 is another fragmentary cross sectional view taken along line 2—2 of a modification of FIG. 2 illustrating a further embodiment of the invention; and FIG. 4 is a graphic representation illustrating the strength properties of the preferred composition as a function of the predominant crystal phases in the glass-ceramic material.

Turning now to a consideration of the drawings and in particular to FIG. 2, there is shown a fragmentary cross sectional view of a smooth surface electrical heating unit 10 which has a heat spreader plate 12 of high thermal conductivity, preferably of a thin composite metal sheet material with a thin center core 13 for distributing the heat rapidly over the entire plate so as to obtain a generally uniform temperature distribution. Such a core would be selected from metals and alloys such as copper, silver and aluminum. Copper has very low strength at temperatures ranging in the vicinity of 700° C., and also it oxidizes very readily. Since a copper core sheet 13 is of small thickness, on the order of 0.040 inches, it would tend to warp or deform easily under normal use conditions due to thermal stresses caused by temporary uneven temperature distribution during the preheat period and also due to the high temperatures to which it is exposed. Hence, the core 13 is sandwiched or sealed between two thin, integral skins 15 and 17, each of the thickness of about 0.017 inches. Such skins would be selected from metals and alloys such as stainless steel, nickel and chromium. In any selection of materials it should be borne in mind that the core and skin materials should have matched coefficients of thermal expansion or that the skin materials be of sufficient strength to support the stresses arising from any thermal mismatch without distortion. In order to avoid exposure of the copper on the peripheral edge of the plate, the two stainless steel skins 15 and 17 are sealed over the edge of the core with a pinching action to protect against corrosion and oxidation. The stainless steel skins 15 and 17 being on the outer surface of the composite plate 12 provide strength to the plate and resists warpage because it combines a high strength with high heat diffusivity, which no single material plate can provide. This thin composite sheet material 12 is illustrated by a central copper core 13 and two outer stainless steel skins 15 and 17, and it may be formed of individual sheets which are "area welded" by a process such as explosive welding, which causes a bonding of the metal sheets along their mating surfaces.

A metal sheathed resistance heating element 14 is brazed to the underside of the heat spreader plate 12. As is well understood by those skilled in this art, such a metal sheathed heating element 14 would include a central electrical resistance, nichrome heating wire of helical formation that is inserted into a thin metal tube or sheath of Inconel, stainless steel or the like. Then the sheath is filled with a suitable electrically insulating and thermally conducting material such as magnesium oxide (MgO) or the like to separate the heater wire from the metal sheath. The top surface of the heating element 14 is flattened so as to obtain a good contact area of the metal sheath with the heat spreader plate 12. Two terminals 19 of the heating element are shown in FIG. 1 extending down in a vertical direction beneath the heating element 14, and are adapted for receiving a slip-on connector (not shown) for making an electrical connection therewith as is conventional in this art.

In order to strengthen the heat spreader plate 12, the edge of the plate is provided with a downturned flange 22 thereby giving the heat spreader plate a configuration similar to an inverted shallow pan. Another means of reinforcing the heat spreader plate 12 is to provide a series of diagonal or radial struts 16 which are arranged edgewise and fastened to the underside of the heat spreader plate and possibly to the sheath of the heating element 14 as by brazing or similar methods. Such strut members 16 may be of many different configurations as would be obvious to a person of ordinary skill in the art. The purpose is to give the heat spreader plate sufficient depth or beam action so that it does not deflect readily under thermal or mechanical stresses.

As shown in FIG. 2, a reflector pan 18 is provided beneath the heating unit 10 and separated therefrom by an annular heat resistant spacer 20, so as to direct the heat from the heating element 14 in an upward direction. This reflector may be used as a hold down means for the heating unit. An adjustable tension member in the form of an inverted J-bolt 39 is adapted to be connected between a reinforcing member 38 and the reflector pan 18. The reinforcing member 38 is provided with an aperture 41 through which the head of the J-bolt is inserted. The reflector pan 18 has a central opening 43 for receiving the lower end of the J-bolt therethrough. The lower end of the bolt has a threaded portion for receiving an adjusting nut 45 thereon.

Turning now to the unique improvement of the present invention, the glass-ceramic coating 30 discussed hereinabove is bonded directly to the surface of the heat spreader plate 12. In the embodiment shown in FIG. 2 the glass-ceramic coating is applied only to the upper surface and covers the portion exposed to view on the surface of the heating apparatus. On the other hand, it may be advantageous to coat both the top surface and the bottom surface of the heat spreader plate 12 together with the heating means 14 as illustrated by FIG. 3.

In forming the glass-ceramic coating 30, the batch ingredients are initially weighed and mixed as, for example, by ball milling. Then the batch is melted at elevated temperatures of about 1,200°–1,250° C. to form a homogeneous melt, quenched in cold water, and ball milled to a particle size of about −100 mesh U.S. Standard. The glass particles are thereafter combined with about 3–4% by weight of a suspending agent, e.g. clay, calcined clay, or colloidal silica and minor amounts of other conventional additives, e.g. electrolytes such as sodium pyrophosphate, sodium nitrite, to form an aqueous slip. The metal substrate is prepared for forming an adherent coating by sandblasting or oxidizing the metal surface and then the aqueous slip is applied to the metal substrate by conventional means such as spraying, dipping or coating. The coated metal substrate is now dried to remove the vehicle and the enamel is matured at a sufficient temperature of about 1,000° C. for about 1–3 minutes. While the exact heat treatment for nucleation and crystal growth will vary to some extent with the initial glass composition within the ranges described, we have found that generally the optimum conditions for nucleation are about 500°–650° C. for about 0.25–1 hour, while the crystal growth temperatures are preferably about 750°–900° C. for about 0.5–4 hours. When the growth temperature is below about 750° C., the predominant crystal phase is lithium metasilicate and additionally when the growth temperature exceeds 950° C. the crystal phase is converted to the lithium metasilicate.

Referring now to FIGS. 4a and 4b, the glass composition used was the preferred glass of Example I which had been cast into glass rods and then been subjected to a nucleation temperature of 645° C. for 1 hour. Thereafter as shown in FIG. 4b, the nucleated glass rods were subjected to a crystal growth heat treatment for four hours at various temperatures. The results are graphically shown to indicate that at temperatures below about 750° C., the predominant crystal phase is lithium metasilicate. As the temperature is increased from about 750° C.–950° C., the predominant crystal phase present becomes lithium disilicate. These crystalline phases were determined by X-ray diffraction techniques. Thereafter, the heat treated rods were abraded by tumbling the rods in 600 grit silicon carbide for 5 minutes. The tensile strengths were determined by a four point bending of the abraded rods. The data obtained are graphically shown in FIG. 4a wherein the strengths are given in kilo pounds per square inch and the crystal phases correspond to those of FIG. 4b. In comparison, the parent glass subject to a similar surface preparation has tensile strengths of about 10,000–15,000 psi. As is graphically shown in FIG. 4a, the presence of lithium metasilicate crystals in the glass ceramic has no significant effect on the tensile strength. However, as the crystalline phase becomes lithium disilicate, the tensile strength of the glass-ceramic increases remarkably and was found to be in the range of 22,000–70,000 psi.

Coatings of our novel glass ceramic-materials, on a surface heating unit as shown in FIG. 1, had excellent mechanical, thermal and chemical properties. Thus, the coatings showed excellent stain resistance to mild organic acids as found in lemon juice, ketchup, barbecue sauce, etc. The thermal properties of the novel glass-ceramic coated heating unit are illustrated by the fact that when sodium chloride (m.p. 801° C.) was sprinkled on the surface of an energized heating unit, the salt became molten while the glass-ceramic coating still remained rigid, maintained its adhesion to the metal substrate, and was not attacked by the molten salt. It should be noted that the glass-ceramic coatings useful in the present invention may be distinguished from those described in U.S. Pat. No. 2,920,971 in that the latter materials have a coefficient of expansion of about $0 \times 10^{-7}$ per °C. whereas our materials are substantially higher and more closely match the thermal expansion of the metallic substrates used in the heat spreader plate. Other commercially available enamels fail to meet the mechanical, thermal or chemical requirements for making the high temperature surface heating unit of our invention.

Our invention is further illustrated by the following examples. The compositions, unless otherwise noted, are given in weight percent and mole percent as calculated from the batch on the oxide basis. Initially glasses were prepared by melting the batch ingredients under standard conditions at temperatures of 1,200°–1,600° C. for about 4–20 hours in platinum crucibles.

EXAMPLE I

A preferred glass composition was prepared and melted from batch ingredients to yield the following formulation on the oxide basis:

| Constituent | Weight % | Mole % |
|---|---|---|
| $SiO_2$ | 73.0 | 67.5 |
| $Li_2O$ | 13.7 | 25.4 |
| $K_2O$ | 5.6 | 3.3 |
| $Al_2O_3$ | 4.9 | 2.7 |
| $P_2O_5$ | 2.8 | 1.1 |

The batch ingredients were weighed and mixed by ball milling. The batch was then placed in a platinum crucible and melted at a temperature of 1,200°–1,250° C. overnight. The hot melt was quenched in cold water and ball milled to a particle size of −100 mesh U.S. Standard.

A slip for application onto a metal plate was prepared from the following formulation:

| Ingredient | Parts by weight |
|---|---|
| Glass frit (−100 mesh) | 1000 |
| Ferro No. 55 Clay (calcined) | 40 |
| Sodium aluminate | 2.1 |
| Bentonite | 2.1 |
| Gum tragacanth | 0.2 |
| Potassium carbonate | 2.5 |
| Distilled water | 460 |

The mixture was ball milled for about 1 hour to form a homogeneous dispersion. The slip was then applied to yield a fired thickness of 0.006″ onto a metal plate by the following technique. The slip was adjusted to a specific gravity of 1.68 gm/cm³ by the addition of water. Electrolytes such as tetrasodium pyrophosphate or sodium nitrite were added to adjust the consistency of the slip to the point that a metal sheet dipped into the slip would retain about 36 grams of slip per square foot of metal area on removal and drainage of the metal part.

In applying the slip onto the metal substrate, the surface of the metal was initially prepared for obtaining an adherent coating by sandblasting and/or oxidizing the metal. The slip was loaded in a spray gun container and applied to the substrate. Thereafter the sprayed substrate was dried at a temperature of about 100° C., the dried coated substrate was fired at a temperature of 1,000 ° C. for 1 minute and cooled to room temperature. Then the glassy material was nucleated at a temperature of 645° C. for 1 hour and subjected to a crystal growth treatment of 830° C. for 4 hours. The predominant crystalline phase obtained was lithium disilicate ($Li_2O \cdot 2SiO_2$).

Metal substrates coated by the above technique or modifications thereof included the following:

316L Stainless steel clad copper
321 Stainless steel [a]
430 Stainless steel [a] clad copper
Inconel 600 (International Nickel Co., 72% min. Ni, 14–17% Cr, 6–8% Fe, 1.75–2.75% Nb, hot rolled and heat treated for high temperature applications)
Inconel 625 (International Nickel Co.)
Rene' 41 (General Electric Co., a precipitation hardened Ni based, high temperature alloy)
Tri-Namel (Inland Steel Co., 0.06 C, 0.30 Mn, 0.12 max. Cu, 0.05 Al, 0.30 Ti, bal. Fe, hot rolled, for sheets for enamelling, specially prepared)
Ti-Namel clad copper
Enamelling steel
NOTE: a. These stainless steels are designated by AISI type numbers.

EXAMPLES II–X

Following the procedure of Example I, various glass compositions were melted as shown in Table I below:

TABLE I.—COMPOSITIONS OF GLASS-CERAMICS

| Example | $SiO_2$ w/o | $SiO_2$ m/o | $LiO_2$ w/o | $LiO_2$ m/o | $Al_2O_3$ w/o | $Al_2O_3$ m/o | $K_2O$ w/o | $K_2O$ m/o | $P_2O_5$ w/o | $P_2O_5$ m/o | $B_2O_3$ w/o | $B_2O_3$ m/o |
|---|---|---|---|---|---|---|---|---|---|---|---|---|
| II[b] | 71.8 | 67.31 | 12.6 | 23.76 | 5.1 | 2.82 | 4.8 | 2.87 | 1.65 | 0.65 | 3.2 | 2.59 |
| III[b] | 73.41 | 67.7 | 13.91 | 25.8 | 4.83 | 2.62 | 4.66 | 2.74 | 2.92 | 1.14 | | |
| IV | 73.0 | 67.5 | 13.7 | 25.4 | 4.9 | 2.7 | 5.6 | 3.3 | 2.8 | 1.1 | | |
| V | 79.6 | 69.4 | 14.5 | 26.2 | | | 5.7 | 3.3 | 2.9 | 1.1 | | |
| VI | 71.1 | 64.3 | 15.6 | 28.5 | 3.9 | 2.1 | 6.2 | 3.6 | 3.2 | 1.2 | | |
| VII | 79.0 | 69.3 | 16.0 | 28.2 | 1.8 | 0.9 | 2.1 | 1.2 | 1.1 | .4 | | |
| VIII | 78.5 | 69.5 | 15.5 | 27.6 | 1.8 | .9 | 2.0 | 1.1 | 2.2 | .8 | | |
| IX | 77.5 | 69.9 | 14.5 | 26.3 | 5.2 | 2.8 | | | 2.9 | 1.1 | | |
| X | 81.3 | 71.7 | 15.2 | 27.0 | | | | | 3.5 | 1.3 | | |

NOTE: [b] The compositions of Examples II + III were determined by analysis of the glass.

The compositions were then formed into rods which were subjected to heating treatments to induce nucleation and crystal growth. The temperatures and time periods of the heat treatments are shown in Table II below:

TABLE II

Summary of Heat Treatments

| Composition | Nucleation Temp.°C. | time (hr) | Growth Temp.°C. | time (hr) |
|---|---|---|---|---|
| Example II | 645 | 1 | 830 | 4 |
|  | 645 | 1 | 910 | 4 |
|  | 645 | 1 | 830 | 168 |
| Example III | 645 | 1 | 725 | 4 |
|  | 645 | 1 | 800 | 4 |
| Example IV | 553–654 | 1 | 830 | 4 |
| Example V | 645 | 1 | 725 | 4 |
|  | 645 | 1 | 830 | 4 |
|  | 645 | 1 | 910 | 4 |
| Example VI | 645 | 1 | 725 | 4 |
|  | 645 | 1 | 830 | 4 |
|  | 645 | 1 | 910 | 4 |
| Example VII | 645 | 1 | 910 | 4 |
|  | 645 | 1 | 930 | 2 |
| Example VIII | 645 | 1 | 830 | 4 |
| Example IX | 645 | 1 | 830 | 4 |
|  | 645 | 1 | 910 | 4 |
| Example X | 645 | 1 | 715–825 | 4 |

It was observed that of the glass-ceramics studied, only the composition of Example X, essentially a lithiasilica binary composition with a small amount of $P_2O_5$, showed any liquid-liquid immiscibility in the amorphous glassy state. Liquid phase separation occurred on cooling from the melt. Crystallization of the lithium silicate occurred only in the form of the lithium disilicate and the lithium metasilicate was not observed with the heat treatment set forth, for example X.

Composition of Example IX which was essentially a ternary composition ($Al_2O_3$-$Li_2O$-$SiO_2$) with a small amount of phosphate showed only a small amount of lithium metasilicate after 1 hour at 645° C., the main crystalline phase present being lithium disilicate. On further growth heat treatment only lithium disilicate was present.

Composition of Example V was also essentially a ternary glass-ceramic with a small amount of phosphate added but instead of containing $Al_2O_3$, it contained $K_2O$. This glass-ceramic, too, after the 645° C. 1 hour treatment had more lithium disilicate than metasilicate. The metasilicate on further heat treatment at the growth temperatures about 750° C. quickly disappeared.

The remaining essentially quarternary glass-ceramics ($Al_2O_3$-$K_2O$-$Li_2O$-$SiO_2$) with small amounts of $P_2O_5$, all showed considerable lithium metasilicate with little or no lithium disilicate after holding at 645° C. for 1 hour. Transformation to the lithium disilicate occurred during the growth treatment at temperatures above about 750° C. Thus, the glass ceramics obtained in Examples II, III, IV, VII, and VIII, after 4 hours heat treatment at 830° C. yielded lithium disilicate as the predominant crystalline phase with little or no lithium metasilicate.

It will be appreciated that the invention is not limited to the specific details shown in the examples and illustrations and that various modifications may be made within the ordinary skill in the art without departing from the spirit and scope of the invention.

We claim:

1. A surface heating apparatus comprising a metallic heat spreader plate of high thermal conductivity, an insulated electrical resistance heating element attached to the underside of said plate for heating thereof, and a glass-ceramic coating covering at least the upper surface of the plate, said glass-ceramic consisting essentially as calculated from the batch on the oxide basis in weight percent of 6–20% $Li_2O$, 0–10% $Al_2O_3$, 70–80% $SiO_2$, 0.5–6.0% $P_2O_5$, 0–10% $B_2O_3$, 0–6% $K_2O$ and 0–5% ZnO, wherein the coefficient of expansion of the glass-ceramic is in the range of $80–120\times10^{-7}$ per °C. and the major crystalline phase is lithium disilicate.

2. The heating apparatus of claim 1, comprising additionally a reinforcing member attached to the underside of said plate to prevent warpage and a reflector pan beneath the heating element to direct the heat in an upward direction.

3. The heating apparatus of claim 1, wherein said glass-ceramic coating has a thickness of about 3 to 12 mils.

4. The heating apparatus of claim 2, wherein said coating covers both sides of the heat spreader plate and the heating element.

5. The heating apparatus of claim 1, wherein the glass-ceramic coating contains up to about 50% of a crystalline phase.

6. The heating apparatus of claim 1, wherein said glass-ceramic coating additionally contains up to 5% by weight of a conventional coloring agent.

7. The heating apparatus of claim 1, wherein said glass-ceramic coating consists essentially as calculated from the batch on the oxide basis in weight percent of about 73.0% $SiO_2$, 13.7% $Li_2O$, 5.6% $K_2O$, 4.9% $Al_2O_3$ and 2.8% $P_2O_5$.

8. The heating apparatus of claim 1, wherein said heat spreader plate is a composite metal sheet material having a core selected from the group consisting of copper, silver and aluminum placed between two integral outer layers of a metal or alloy selected from the group consisting of carbon steel, stainless steel, nickel and chromium.

* * * * *